United States Patent
Patel et al.

(10) Patent No.: US 10,293,862 B1
(45) Date of Patent: May 21, 2019

(54) SIDE SILL ASSEMBLY REINFORCED WITH A TUBE AND BOX-SHAPED BRACKETS

(71) Applicant: Ford Global Technologies, LLC, Dearborn, MI (US)

(72) Inventors: Deepak Patel, Canton, MI (US); Sushil Shastry, Brighton, MI (US); Robert Schwalm, Windsor (CA); Matthew B Makowski, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/870,164

(22) Filed: Jan. 12, 2018

(51) Int. Cl.
*B62D 25/02* (2006.01)

(52) U.S. Cl.
CPC .................. *B62D 25/025* (2013.01)

(58) Field of Classification Search
CPC .................................... B62D 25/025
USPC ....................................... 296/209
See application file for complete search history.

(56) References Cited

U.S. PATENT DOCUMENTS

| | | | |
|---|---|---|---|
| 4,440,434 A | 4/1984 | Celli | |
| 6,409,257 B1* | 6/2002 | Takashina | B62D 21/157 296/187.12 |
| 6,666,500 B2* | 12/2003 | Polzer | B62D 21/157 296/187.12 |
| 6,951,366 B2 | 10/2005 | Tomita | |
| 8,366,185 B2 | 2/2013 | Herntier | |
| 9,725,118 B2* | 8/2017 | Alwan | B62D 21/157 |
| 10,029,734 B2* | 7/2018 | Akhlaque-e-rasul | B62D 27/026 |
| 2005/0121926 A1* | 6/2005 | Montanvert | B62D 21/157 293/128 |

FOREIGN PATENT DOCUMENTS

CN 2813408 Y 9/2006

* cited by examiner

*Primary Examiner* — Dennis H Pedder
(74) *Attorney, Agent, or Firm* — Vichit Chea; Brooks Kushman P.C.

(57) ABSTRACT

A side sill assembly for a vehicle includes an inner shell connected to an outer shell and a reinforcement assembly. The reinforcement assembly includes a longitudinally extending tube and a plurality of reinforcement brackets provided at longitudinally spaced locations along the length of the tube. The reinforcement brackets each include a front wall and a back wall connected by an outer side wall. The reinforcement brackets define recesses for receiving the tube that is welded to the front walls and the back walls where the tube contacts an edge of the recesses. The reinforcement brackets may include a top flange on a top edge and a base flange on a bottom edge of each of the front walls and back walls. An inner flange is provided on an inner edge of each of the front walls and back walls that is welded to the inner shell.

15 Claims, 5 Drawing Sheets

SIDE SILL ASSEMBLY REINFORCED WITH A TUBE AND BOX-SHAPED BRACKETS

TECHNICAL FIELD

A side sill assembly for a vehicle reinforced to reduce axial, torsional, and bending deformation in side impacts and small offset collisions.

BACKGROUND

A side sill assembly, or rocker assembly, of a vehicle body includes an outer shell and an inner shell that house reinforcing members. Reinforcing members are required to meet structural standards in side impacts and small offset collisions. Side impact tests include a Moving Deformable Barrier (MDB) Test and a Side Impact Rigid Pole (Pole Impact) test. In the MDB test the side sill assembly is subjected to bending and torsional loading. In the Pole Impact test the side sill assembly is subjected to bending forces.

Side sill assembly reinforcements are required to meet all of the requirements while being subjected to different forces and loads from different directions. The reinforcement must effectively manage energy absorption and bending deformation of the assembly to meet SORB and side impact requirements. The weight of side sill assemblies must also be minimized to meet weight reduction and fuel economy objectives.

Referring to FIG. 1, a fragmentary side elevation view is provided of a portion of a side sill assembly 10 attached to an A-pillar assembly 12 that includes prior art reinforcements 14. Reinforcements 14 are attached at spaced locations on the inner panel 16 of the side sill assembly 10. The reinforcements 14 provide protection against side impacts but the side sill assembly 10 is subject to axial loading in SORB impacts. In a Small Offset Rigid Barrier (SORB) test the side sill assembly axial loading may result in bending of the side sill assembly 10.

This disclosure is directed to solving the above problems and other problems as summarized below.

SUMMARY

According to one aspect of this disclosure, a side sill assembly for a vehicle is disclosed that includes an inner shell connected to an outer shell and a reinforcement. The reinforcement includes a longitudinally extending tube and a plurality of reinforcement brackets provided at longitudinally spaced locations on the tube. The reinforcement brackets each including a front wall and a back wall connected by an outer side wall that define recesses for receiving the tube and are welded to the tube.

According to other aspects of this disclosure, the side sill assembly may further comprise a top flange on a top edge of each of the front walls and back walls and an inner flange on an inner edge of each of the front walls and back walls. The top flange faces an inner upper surface of the outer shell and the inner flange is welded to the inner shell. The front walls and the back walls may define recesses that conform to a portion of an outer surface the tube. The tube may be welded to the front walls and the back walls where the tube contacts an edge of the recesses. The side sill assembly may further comprise base flanges provided at a bottom edge of the front walls and the back walls that face a lower surface of the outer shell.

The reinforcement defines recesses at a selected height in an inner portion of the brackets. The tube is disposed in the recesses to reinforce the side sill assembly against axial loads applied to the tube.

The cross-sectional shape of the tube may be a square, a rectangular, an oval, a circle, or a B-shaped beam.

According to another aspect of this disclosure, a side sill assembly is disclosed that includes an inner shell connected to an outer shell and a plurality of brackets that are welded to a longitudinally extending tube. Each rib includes an outer wall facing the outer shell and front and back walls extending inwardly from the outer wall. Front and back weld flanges are provided on an inner side of the front and back walls and extend parallel to the outer wall. The weld flanges are welded to the inner shell. A tube is welded to the brackets that are spaced longitudinally along the tube.

According to another aspect of this disclosure, a vehicle body is disclosed that includes a floor pan and side sill housings attached to right and left sides of the floor pan. A reinforcement is assembled inside the side sill housings that includes a tube extending fore-and-aft inside the side sill housings, and a plurality of box-shaped reinforcement brackets secured to the tube in a longitudinally spaced relationship. The reinforcement brackets are welded to the tube and an inner portion of the side sill housings.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 2:
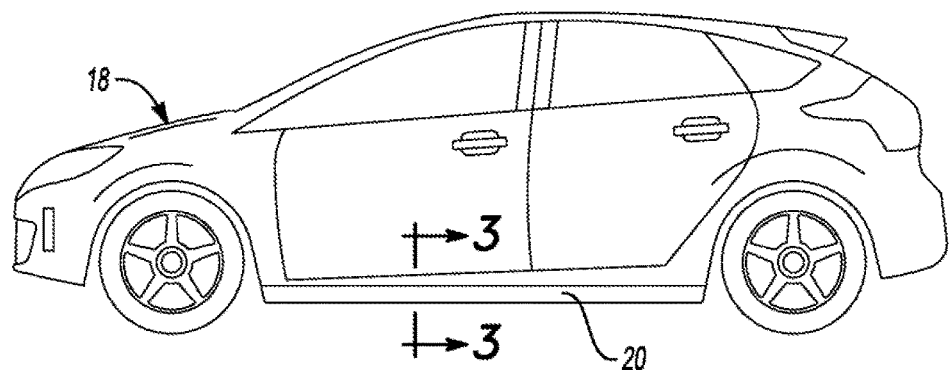
FIG. 2 is a diagrammatic side elevation view of a vehicle made according to this disclosure.

Referring to FIG. 2, a vehicle 18 is shown to include a side sill assembly 20, or rocker assembly that is located beneath the doors of the vehicle 18.

Figure 3:
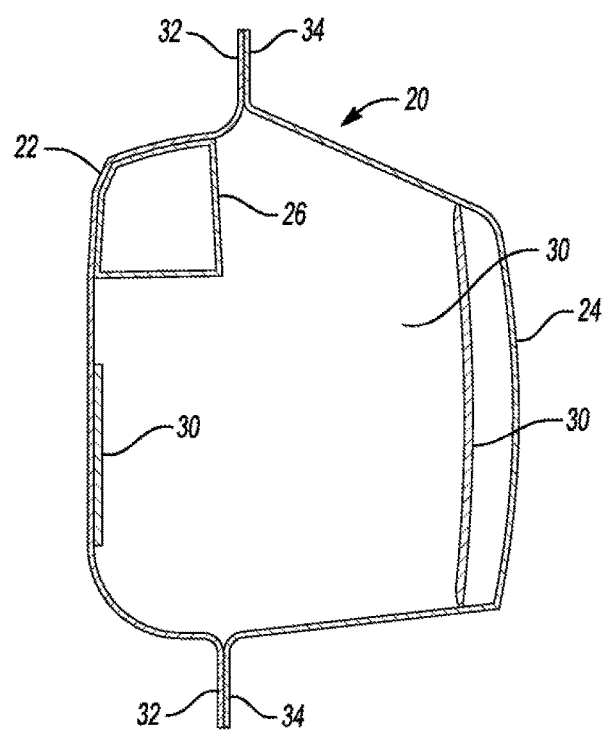
FIG. 3 is a diagrammatic cross-section view of a side sill assembly made according to one embodiment of this disclosure.

Referring to FIG. 3, the side sill assembly 20 of the vehicle 18 shown in FIG. 2 is shown in cross-section. The side sill assembly 20 includes an inner shell 22, or inner side sill and an outer shell 24, or rocker panel or outer rocker panel. A tube 26 is shown disposed within the inner shell 22 and outer shell 24. The tube 26 is generally square in cross-section and extends in the longitudinal vehicle direction.

A reinforcement bracket 30 is shown within the inner shell 22 and outer shell 24. The reinforcement bracket 30 is attached to the tube 26 as will be more fully described below with reference to FIGS. 4-6.

Figure 4:
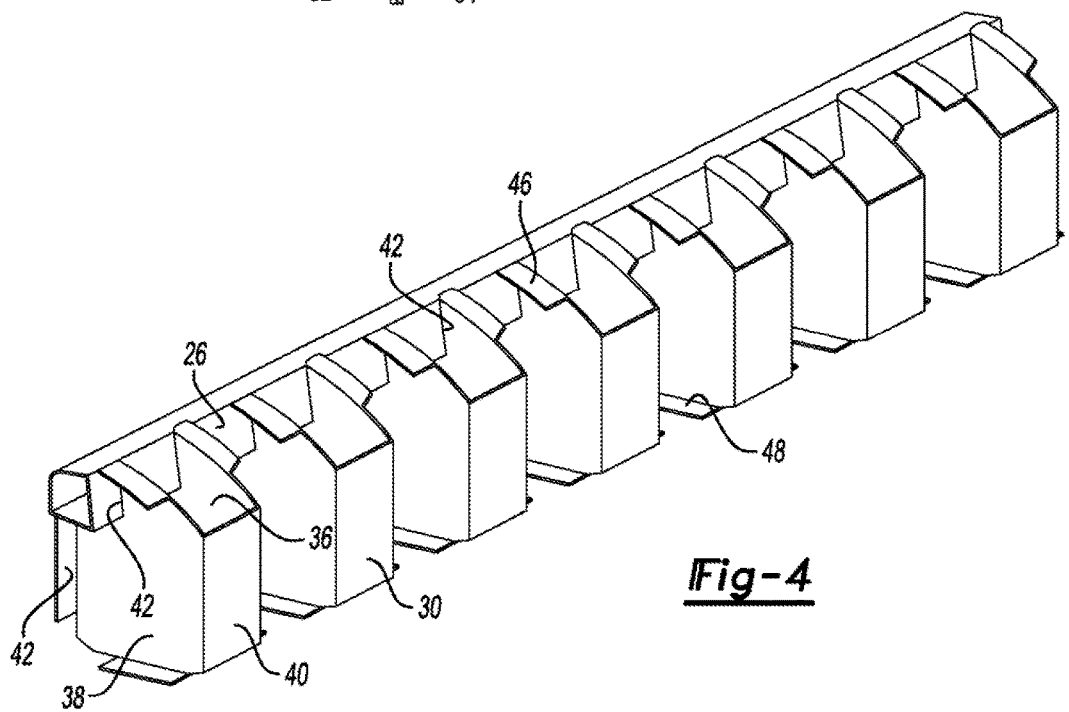
FIG. 4 is a perspective view of a reinforcement made according to one embodiment of this disclosure.
Figure 5A:
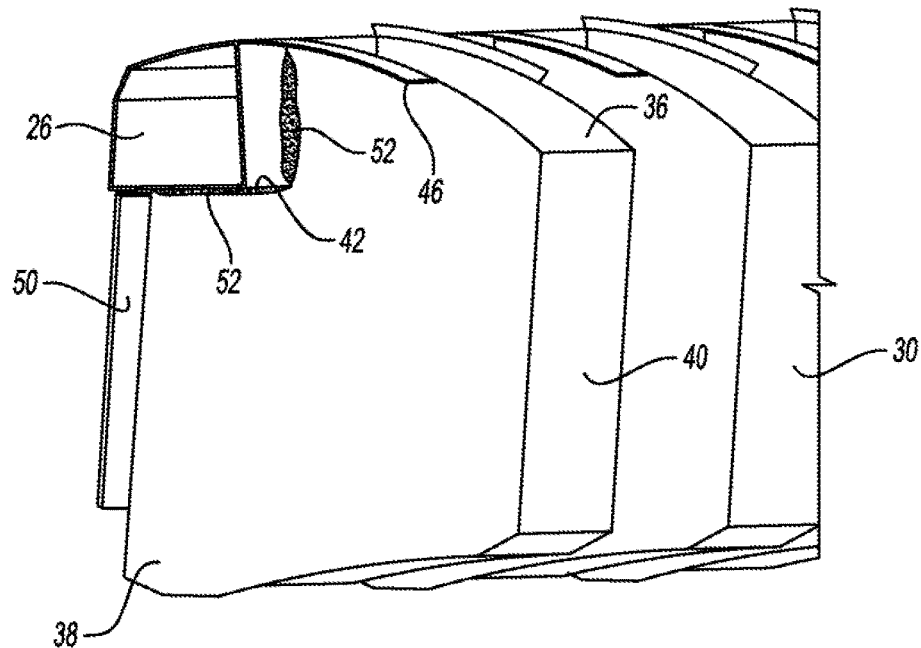
FIGS. 5A-5C are fragmentary perspective views of three different embodiments of this disclosure.
Figure 6:
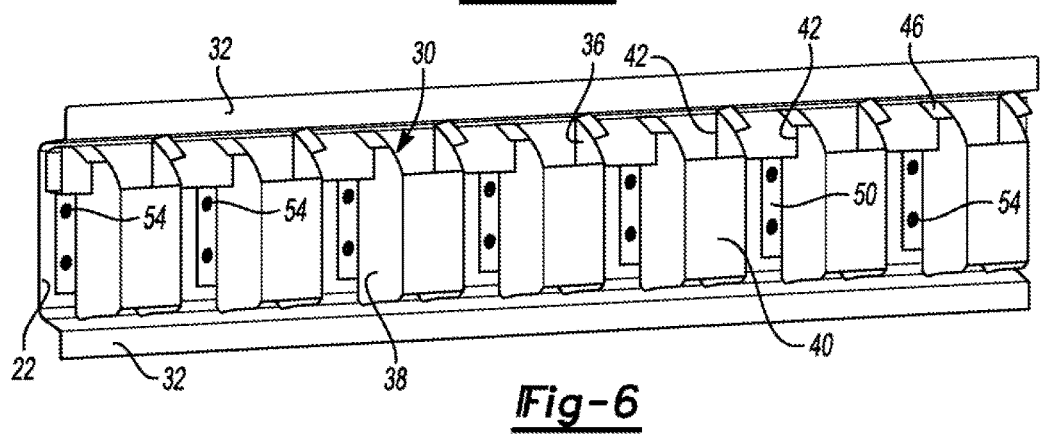
FIG. 6 is a perspective view of a reinforcement shown welded to a side sill inner panel made according to one embodiment of this disclosure.

Referring to FIGS. 4 and 5A and 6, the tube 26 and reinforcement brackets 30 includes the longitudinally extending tube 26 in a plurality of reinforcement brackets 30 that are spaced along the length of the tube 26. Side sill weld flanges 32 and rocker weld panel flanges 34 are provided on the top and bottom of the side sill assembly 20. The side sill weld flange 22 and rocker panel weld flanges 34 are welded together to form the side sill assembly 20.

Each of the reinforcement brackets 30 includes a front wall 36, back wall 38 and an outer side wall 40. The front wall 36 is connected by the outer side wall 40 to the back wall 38. The front wall 36 and back wall 38 both define recesses 42 in which the tube 26 is received when the reinforcement is assembled.

Each of the reinforcement brackets includes a top flange 46 and a base flange 48. An inner weld flange 50 is provided on an inner edge of the front wall 36 and back wall 38. The tube 26 is welded to the recesses 42 defined by the front wall 36 and back wall 38. A seam weld 52 is formed at the juncture of the tube 26 and the edges of the recess 42. A spot weld 54 is used to secure the inner weld flange 50 on the inner edge of the front wall 36 and back wall 38. One or more spot welds 54 may be used to weld the inner weld flange 50 to the inner shell 22.

Figure 5B:
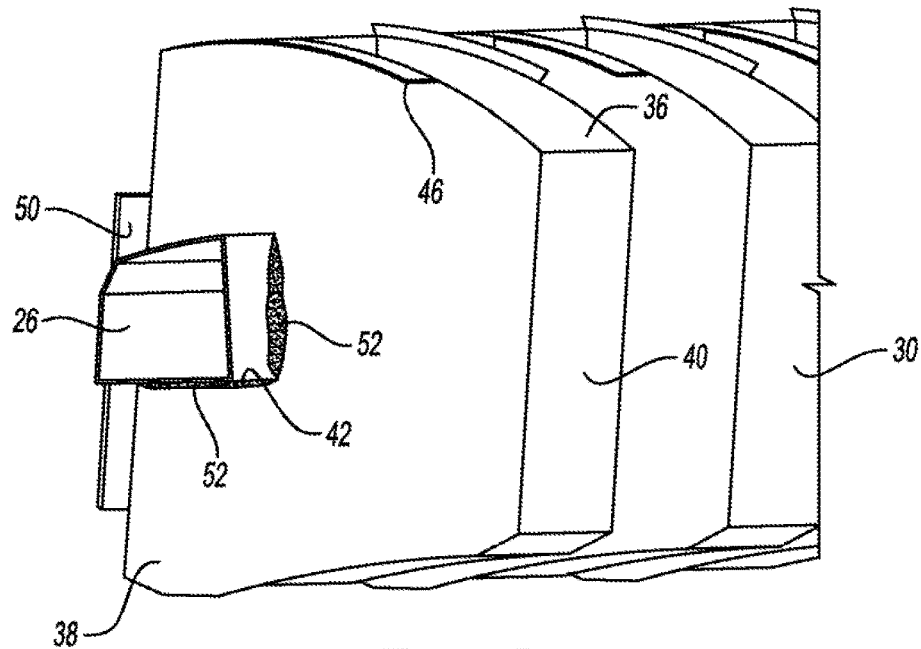

Referring to FIG. 5B, an alternative embodiment is shown wherein the tube 26 is received in a recess 42. The recess and the embodiment of FIG. 5B is located at an intermediate location in the brackets 38. The tube 26 is again seam welded by a seam weld 52 inside the recess 42. The inner weld flange 50 is shown on an inner edge of the back wall 38.

Figure 5C:
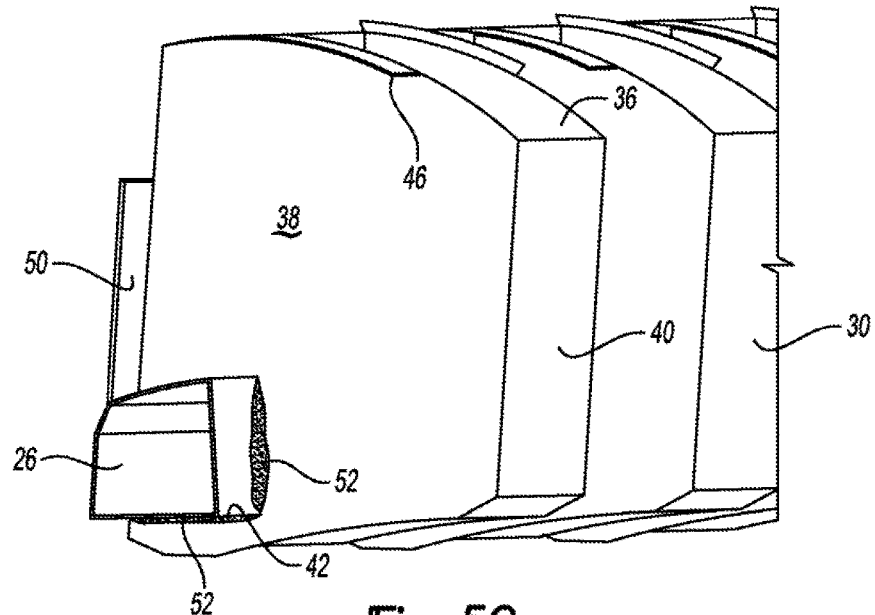

Referring to FIG. 5C, another alternative embodiment is shown which the tube 26 is received in a recess 42 formed in the back wall 38. It should be understood that the tube 26 may be secured within a recess at a height that depends on the desired level for the reinforcement to minimize bending in a SORB collision. In some vehicles, the structure of the A-pillar joint to the side sill assembly may be higher or lower which may in turn cooperate more effectively with the side sill assembly if the tube is placed at a particular height of the side sill assembly.

Referring to FIG. 6, a reinforcement including the tube 26 and a plurality of reinforcement brackets 30 is shown assembled to an inner shell 22. The reinforcements are welded to the inner shell 22 by a plurality of spot welds 54 that weld the inner weld flange 50 to an inside surface of the inner shell 22. As previously described, the reinforcement brackets 30 define recesses 42 in both the front wall 36 and the back wall 38 that are connected by the outer side wall 40. The reinforcement brackets 30 are shown to include a top flange 46 but it should be understood that a base flange 48 (not clearly shown in FIG. 6) may also be provided on a bottom edge of the front wall 36 and back walls 38.

Figure 7A:
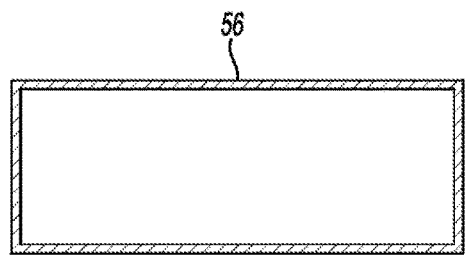
FIGS. 7A-7E are cross-section views of alternative tube shapes that may be included in the disclosed side sill assembly reinforcement.
Figure 7B:
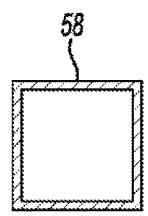
Figure 7C:
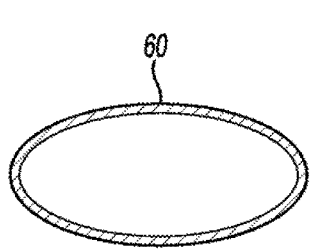
Figure 7D:
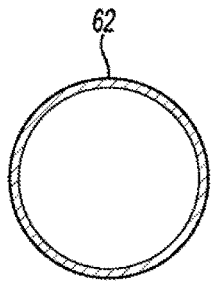
Figure 7E:
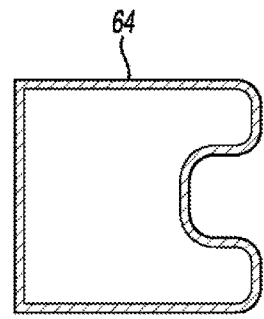

Referring to FIG. 7A-7E, cross-sections are provided for various tube shapes that may be used in conjunction with one of the above-described embodiments of this disclosure. Referring to FIG. 7A, a rectangular shaped tube is shown in cross-section. Referring to FIG. 7B, an oval-shaped tube is shown that has an oval cross-section 60. Referring to FIG. 7C, a tube having a square cross-section 58 is illustrated. Referring to FIG. 7D, a tube having a round cross-section 62 is illustrated. Referring to FIG. 7E, a tube having a B-shaped beam cross-section is illustrated and generally indicated by reference numeral 64.

Figure 1:
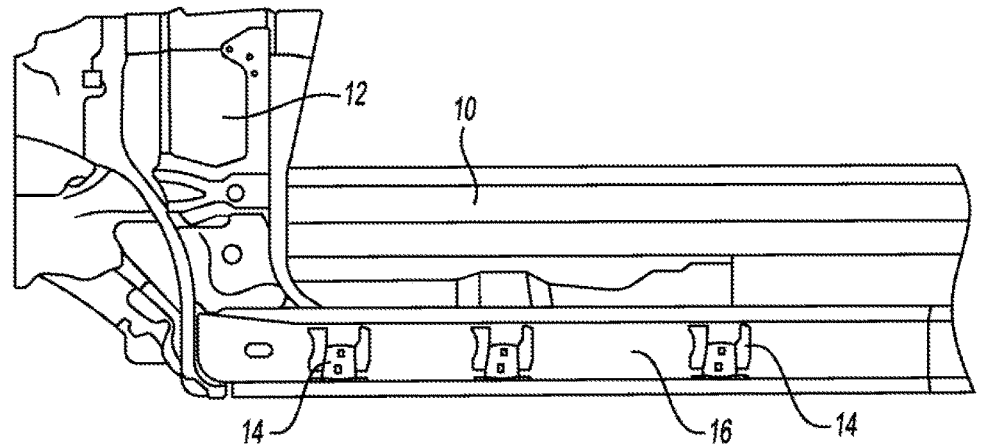
FIG. 1 is a fragmentary side elevation view of a prior art side sill assembly and A-pillar.
Figure 8:
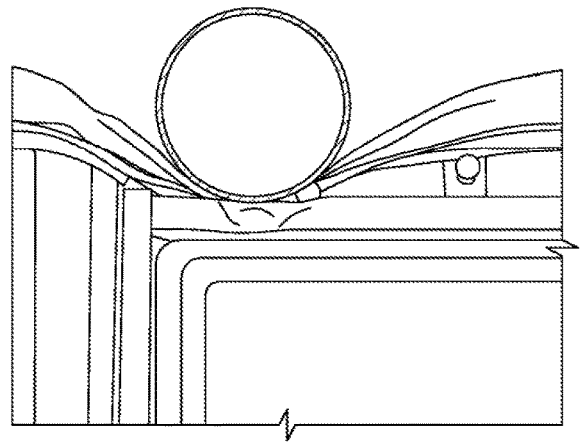
FIG. 8 is a simulated Pole Impact test of the prior art side sill assembly having reinforcements of the type shown in FIG. 1.

Referring to FIG. 8, the structural properties of a prior art side sill assembly is shown in a Pole Impact test on a side sill assembly made in accordance with the embodiment of FIG. 1 that includes spaced reinforcements but lacks the longitudinally extending tube as shown and described with reference to FIGS. 3, 5A and 6. In accordance with the Pole Impact test, the pole is shown to crush the side sill assembly and protrude into the inner shell of the side sill assembly.

Figure 9:
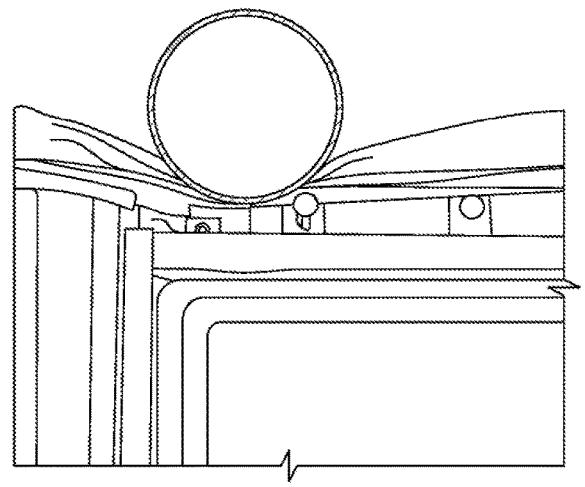
FIG. 9 is a simulated Pole Impact test of the side sill assembly having a reinforcement assembly of the type shown in FIG. 4.

Referring to FIG. 9, the results of a simulated Pole Impact test is shown with a testing the extent of resistance to incursions. The result of the test shown in FIG. 9 of a reinforcement made according to FIG. 4 shows substantially less intrusion toward the passenger compartment and reduced deformation of the side sill assembly.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A side sill assembly for a vehicle comprising:
   an inner shell connected to an outer shell; and
   a reinforcement including a longitudinally extending tube and a plurality of reinforcement brackets provided at longitudinally spaced locations on the tube, the reinforcement brackets each including a front wall and a back wall connected by an outer side wall, wherein the front and back walls define recesses for receiving the tube that are welded to the tube.

2. The side sill assembly of claim 1 further comprising:
   a top flange provided at a top edge of each of the front walls and the back walls, the top flange facing an inner upper surface of the outer shell; and
   an inner flange provided at an inner edge of each of the front walls and the back walls, the inner flange being welded to the inner shell.

3. The side sill assembly of claim 2 wherein the front walls and the back walls define the recesses that conform to a portion of an outer surface the tube.

4. The side sill assembly of claim 3 wherein the tube is welded to the front walls and the back walls where the tube contacts an edge of the recesses.

5. The side sill assembly of claim 1 further comprising:
   base flanges provided at a bottom edge of the front walls and the back walls, wherein the base flanges face a lower surface of the outer shell.

6. The side sill assembly of claim 1 wherein the recesses are defined at a selected height in an inner portion of the brackets and the tube is disposed in the recesses to reinforce the side sill assembly against axial loads applied to the tube.

7. The side sill assembly of claim 1 wherein a cross-sectional shape of the tube is selected from the group consisting of:
   a square;
   a rectangular;
   an oval;
   a circle; and
   a B-shaped beam.

8. A side sill assembly comprising:
   an inner shell connected to an outer shell;
   a plurality of brackets each including an outer wall facing the outer shell, front and back walls extending inwardly from the outer wall, front and back weld flanges on an inner side of the front and back walls extend parallel to the outer wall and are welded to the inner shell; and
   a tube welded to the brackets spaced longitudinally along the tube.

9. The side sill assembly of claim 8 wherein the brackets include a top flange provided at a top edge of each of the front walls and the back walls, the top flange facing an inner upper surface of the outer shell.

10. The side sill assembly of claim 8 wherein the brackets include a base flange provided at a bottom edge of the front walls and the back walls, wherein the base flanges face a lower surface of the outer shell.

11. The side sill assembly of claim 8 wherein the front and back walls define recesses that conform to a portion of an outer surface the tube.

12. The side sill assembly of claim 11 wherein the tube is welded to the front and back walls at a juncture of the tube and an edge of the recesses.

13. The side sill assembly of claim 11 wherein the recesses are defined at a selected height in an inner portion of the brackets and the tube is disposed in the recesses to reinforce the side sill assembly against axial loads applied to the tube.

14. The side sill assembly of claim 8 wherein a cross-sectional shape of the tube is selected from the group consisting of:
   a square;
   a rectangular;
   an oval;
   a circle; and
   a B-shaped beam.

15. A vehicle body comprising:
   a floor pan;
   side sill housings attached to right and left sides of the floor pan; and
   a reinforcement including a tube extending fore-and-aft inside the side sill housings, and a plurality of box-shaped reinforcement brackets secured to the tube in a longitudinally spaced relationship, wherein the reinforcement brackets are welded to the tube and an inner portion of the side sill housings.

* * * * *